US008543915B2

(12) United States Patent
Liu et al.

(10) Patent No.: US 8,543,915 B2
(45) Date of Patent: Sep. 24, 2013

(54) "PROOF PRINT" FOR JOB SETTINGS

(75) Inventors: Yue Liu, San Jose, CA (US); Kurt Knodt, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 1578 days.

(21) Appl. No.: 11/879,391

(22) Filed: Jul. 16, 2007

(65) Prior Publication Data

US 2009/0021757 A1    Jan. 22, 2009

(51) Int. Cl.
*G06F 17/27*    (2006.01)

(52) U.S. Cl.
USPC .......................................... 715/274; 715/276

(58) Field of Classification Search
USPC ......... 713/171; 715/274, 171, 276; 345/352; 358/1.14
See application file for complete search history.

(56) References Cited

U.S. PATENT DOCUMENTS

| | | | |
|---|---|---|---|
| 6,608,697 B1 * | 8/2003 | Schorr et al. .................. | 358/1.15 |
| 6,975,417 B1 * | 12/2005 | Hilpl et al. .................... | 358/1.15 |
| 7,126,703 B1 * | 10/2006 | Gillihan et al. ............... | 358/1.14 |
| 2005/0206953 A1 * | 9/2005 | Kujirai et al. ................. | 358/1.15 |
| 2006/0055952 A1 * | 3/2006 | Ferlitsch ....................... | 358/1.13 |
| 2006/0114490 A1 | 6/2006 | Rolleston | |
| 2008/0144080 A1 * | 6/2008 | Randt ........................... | 358/1.15 |

* cited by examiner

*Primary Examiner* — Dough Hutton, Jr.
*Assistant Examiner* — Brian Garmon
(74) *Attorney, Agent, or Firm* — Hickman Palermo Truong Becker Bingham Wong LLP.; Edward A. Becker

(57) ABSTRACT

According to techniques described herein, print job attributes are checked to identify potential conflicts and potential invalid settings. According to one embodiment of the invention, a job setting manager process executing on a printing device is configured to examine and store print job attributes as detected by print interpreter modules. According to an embodiment of the invention, the job setting manager maintains a data structure comprising print job attributes, their values, and other information. As each interpreter module detects a job setting in the print data, the job setting manager receives this setting and its value and checks the data structure to identify conflicts between previously-set job attributes and whether the requested job attribute is supported by the destination printing device. According to an embodiment of the invention, if a conflict is identified, a notification is produced.

20 Claims, 4 Drawing Sheets

| JOB ATTRIBUTE NAME | CREATED/ UPDATED | JOB ATTRIBUTE VALUE | COMMENTS | CONFLICT? |
|---|---|---|---|---|
| NO. OF COPIES | PJL HEADER INTERPRETER | 2 | | |
| DUPLEX | PCL-XL JOB BODY INTERPRETER | DUPLEX LONG EDGE | SET TO "NO DUPLEX" BY PJL MODULE | YES |
| | | | | |
| | | | | |

FIG. 2

"PROOF PRINT" FOR JOB SETTINGS

FIELD OF THE INVENTION

This invention relates generally to printing devices, and more specifically, to an approach for managing print job attributes.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Printing technology has seen tremendous advancement in both functional variation and raw printing speed. Printing devices offering higher and higher page per minute (PPM) output are constantly being introduced into the marketplace. These printers also offer advanced printing and finishing options such as stapling, collating, double-sided printing, and choice of multiple paper sizes.

It is not uncommon for today's printers to print jobs that only a few years ago would have been outsourced to professional printers using printing presses. For example, documents comprising hundreds of pages and conforming to several print options may be printed on standard printing devices available to the general public. The complexity of a print job is only increased in a production printing environment where job settings can be extremely complicated.

Print job settings and specifications may be transmitted to a printer in many ways, such as in the print job header, print job body, a job ticket, web services messages, or directly to a printer via the Internet Printing Protocol (IPP). Each of these techniques may all contain job configuration information on how a user wants the document to be printed. These options may be referred to as job attributes. They may contain values regarding color mode, resolution, paper size, duplex and stapling. They may be created by different applications on the computer creating the print job, including applications which generate the document and the printer driver.

Problems arise where these job attributes may be in conflict; for example, the print job header may specify paper size "A4," but the print job body may specify "letter" size and override the job header setting. The target printer might not support some job attributes; for example, a user may desire to staple an 80-page job, but the target printer might only be able to staple documents of up to 50 pages. Often, in the case where the printer cannot achieve the specified setting, the printer will apply a default setting to overwrite the user's settings.

One approach to dealing with these problems is to print a sample document and see which settings, if any, were applied. However, this approach can consume a large quantity of time and resources in the case of large, complicated jobs. Also, simply examining the finished product might not allow a user to discover which portion of the printing process is causing a problem.

Another approach is to use a "print preview" technique whereby a user may see the document on a display prior to printing. This approach is inadequate because many print options such as stapling cannot be ascertained via print preview. For example, the output of a print preview command cannot indicate whether the target printer is capable of stapling a 90-page document.

Another approach is to use a job ticket, which is a combination of all settings and options a user wants to apply to a job. Some printers accept job ticket data as one way of specifying job settings. However, this does not solve the problems described above, because while the job ticket defines what a user wants, a job ticket does not specify what the output will actually be.

Another approach is simply to allow the last job setting data that reaches the printer to control the output. This approach is inadequate for the reasons specified above with regard to waste of resources. This approach is inefficient if the output is not as the user intended.

Consequently, there is a need for a printing solution that is more suited for today's output devices. There is a need for a printing solution that enhances system performance.

SUMMARY

According to techniques described herein, print job attributes are checked to identify potential conflicts and potential invalid settings. According to one embodiment of the invention, a job setting manager process that executes on a printing device is configured to examine and store print job attributes as detected by print interpreter modules. According to an embodiment of the invention, the job setting manager maintains a data structure comprising print job attributes, their values, and other information. As each interpreter module detects a job setting in the print data, the job setting manager receives this setting and this setting's value and checks the data structure to identify conflicts between previously-set job attributes. The job setting manager also checks whether the requested job attribute is supported by the destination printing device. According to an embodiment of the invention, if a conflict is identified, then a notification is produced.

According to an embodiment of the invention, a job setting manager process receives and stores data that comprises printing attribute values. The job setting manager determines whether a conflict exists between the printing attribute values. If a conflict exists, then the job setting manager process stores data that indicates the conflict and provides feedback identifying the conflict.

According to an embodiment of the invention, a printing device is provided. The printing device includes a print process that is configured to process print data. The print process is configured to cause a printed version of an electronic document to be generated at the printing device. The printing device also includes a job settings manager process that is configured to examine print data. The job settings manager is configured to generate print attribute data that indicates a plurality of attributes of the print data. The job settings manager is configured to identify conflicts in the plurality of attributes. The job setting manager is configured to generate a notification in response to identifying conflicts. In one embodiment of the invention, this notification is in the form of a report that lists the print job's attribute values and which of those attributes conflict with each other. The notification may be printed on a page, displayed on a monitor, or e-mailed to an e-mail in-box, for example.

In one embodiment of the invention, software on the printing device itself is used to simulate running the print job. This is in contrast to alternative approaches in which conflict checking is performed as the print job is being programmed (via a printer driver of job ticketing tool) or as a separate activity with "preflight" software. In one embodiment of the invention, the printing device runs the print job through the normal protocol interpreters and control software without actually feeding any paper.

A single print job might contain multiple printer definition languages (PDLs). According to one embodiment of the invention, the printing device checks for conflicts between print attributes that are specified via different PDLs in the same print job.

BRIEF DESCRIPTION OF THE DRAWINGS

In the figures of the accompanying drawings, like reference numerals refer to similar elements.

FIG. 2 is a block diagram that depicts a job attribute table according to an embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. EXAMPLE ARCHITECTURE
III. JOB ATTRIBUTE TABLE
IV. OPERATIONAL EXAMPLE
V. IMPLEMENTATION MECHANISMS

I. Overview

According to techniques described herein, print job attributes are checked to identify potential conflicts and potential invalid settings. According to one embodiment of the invention, a job setting manager process that executes on a printing device is configured to examine and store print job attributes as detected by print interpreter modules. According to an embodiment of the invention, the job setting manager maintains a data structure comprising print job attributes, their values, and other information. As each interpreter module detects a job setting in the print data, the job setting manager receives this setting and this setting's value and checks the data structure to identify conflicts between previously-set job attributes. The job setting manager also checks whether the requested job attribute is supported by the destination printing device. According to an embodiment of the invention, if a conflict is identified, then a notification is produced. In one embodiment of the invention, this notification is in the form of a report that lists the print job's attribute values and which of those attributes conflict with each other. The notification may be printed on a page, displayed on a monitor, or e-mailed to an e-mail in-box, for example.

In one embodiment of the invention, software on the printing device itself is used to simulate running the print job. This is in contrast to alternative approaches in which conflict checking is performed as the print job is being programmed (via a printer driver of job ticketing tool) or as a separate activity with "preflight" software. In one embodiment of the invention, the printing device runs the print job through the normal protocol interpreters and control software without actually feeding any paper.

A single print job might contain multiple printer definition languages (PDLs). According to one embodiment of the invention, the printing device checks for conflicts between print attributes that are specified via different PDLs in the same print job.

II. Example Architecture

Figure 1:
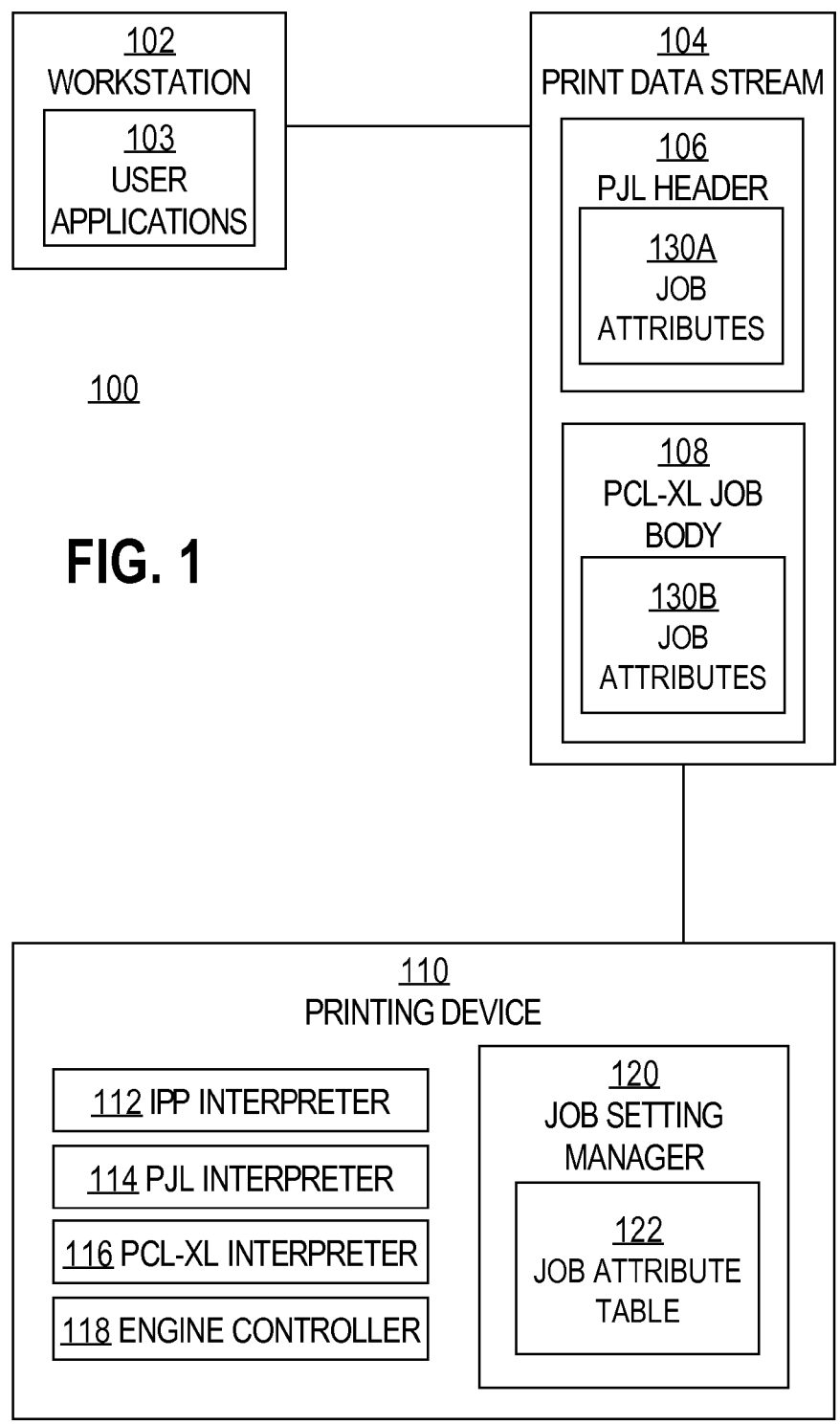
FIG. 1 is a block diagram that depicts an arrangement for proof print job setting according to one embodiment of the invention.

FIG. 1 is a block diagram that depicts an arrangement 100 for a proof print job setting solution according to one embodiment of the invention. As used herein, the phrases "job setting information" and "job attributes" should be considered to be synonymous. Arrangement 100 includes at least one workstation 102 that transmits a print data stream 104 to a printing device 110. The workstation 102 may be configured with user applications 103. Examples of workstation 102 include, without limitation, a personal computer, a personal digital assistant (PDA), or any type of mobile device. Examples of applications 103 include, without limitation, a word processor, a spreadsheet program, an email client, a generic Web browser, a photo management program and a drawing or computer-aided design (CAD) program. Workstations may be configured with fewer or more components and processes, depending upon a particular implementation. Embodiments of the invention are not limited to the example depicted in FIG. 1 and described herein.

Print data stream 104 may be transmitted to printing device 110 from workstation 102. Print data stream 104 may be sent to printing device 110 through a communication protocol such as IPP, ASCII Printing Protocol, PostScript Printing Protocol, Web Services, or others. Print data stream 104 may include job setting information such as paper size and number of copies. This job setting information may be indicated in a PJL header 106, in the form of printer job language (PJL), or a PCL-XL job body 108, in the form of printer control language (PCL or PCL-XL). PJL commands provide job-level control. PCL and PCL-XL commands are compact escape sequence codes that are embedded in the print job before being sent to the printer. A PCL-XL job may contain (a) job setting information in a job ticket header or in PJL header 106 along with (b) job setting information in PCL-XL job body 108. Other protocols and language specifications are envisioned. PJL header 106 may contain job attributes 130A. PCL-XL job body 108 may contain job attributes 130B. Job attributes 130A and 130B may conflict with each other.

Printing device 110 may contain several interpreter modules 112-116. Interpreter modules 112-116 receive data that contain the print job. Interpreter modules 112-116 interpret the data that conforms to the specification of those interpreter modules. Examples of interpreter modules 112-116 include, but are not limited to, an IPP interpreter 112, a PJL interpreter 114, and a PCL-XL interpreter 116. For example, a print job that contains a PJL header and PCL-XL body might arrive at printing device 110. Under such circumstances, the PJL header is interpreted by PJL interpreter 114, and the PCL-XL body is interpreted by PCL-XL interpreter 116. If job setting information in the PJL header conflicts with job setting information in the PCL-XL body, then only one of the conflicting job settings can be administered.

The interpreters may operate in a linear fashion, each processing print data in order. For example, if the PJL header specifies "A4" paper size, and if the PCL-XL body specifies "letter" size paper, then it is likely that the last interpreted job setting will control. However, this may or may not be the user's intention. After the interpreter modules process the print job data, the interpreted data is passed to a printer engine controller 118 so that a printed version of the document can be generated at the printing device.

According to an embodiment of the invention, a job setting manager 120 executing on the printing device creates a new job attribute table 122 for each incoming print job. According to one embodiment of the invention, job setting manager 120 is a process that may be executing on a device other than printing device 110, but which is in communication with printing device 110 either directly or indirectly and via a wired connection or a wireless connection. According to an embodiment of the invention, job setting manager 120 is implemented as a JAVA method, and each job attribute table 122 is data that is contained in an object that is instantiated by job setting manager 120. Other techniques of implementing the job setting manager and job attribute tables are envisioned.

In one embodiment of the invention, when printing device 110 receives a job, job setting manager 120 creates a new job attribute table 122 with default data. This default data may comprise printer defaults for paper size, orientation, number of copies, or any other job attribute. This default data may be defined by a user or may contain default settings that are set during the manufacture or factory configuration of the printing device. Job setting manager 120 receives data from each interpreter module 112-116. In one embodiment of the invention, job setting manager 120 provides an application programming interface (API) for each of interpreters 112-116. In such an embodiment of the invention, interpreters 112-116 invoke job setting manager 120 when those interpreters detect a job attribute. In response, job setting manager 120 checks whether an attribute conflict exists. In one embodiment of the invention, job setting manager records, in job attribute table 122, information that pertains to the job settings.

For example, IPP interpreter module 112 might receive a print job and determine that paper size "A4" has been specified in the IPP data in the print job. Under such circumstances, job setting manager 120 receives that information from IPP interpreter module 112 and stores the job setting in job attribute table 122. According to an embodiment of the invention, job setting manager 120 stores, in job attribute table 122, information pertaining to the job setting information; for example, job setting manager 120 may store (a) the job attribute name, (b) which module specified the job attribute, (c) the value of the job attribute, (d) comments regarding any conflicts, and (e) whether a conflict exists. More or less information may be stored as long as adequate data exists to indicate a conflict between job attributes.

Continuing the example, next, PJL interpreter 114 might receive the print job and determine that paper size "letter" has been specified in the PJL header data in the print job. Under such circumstances, job setting manager 120 receives that information from PJL interpreter 114 and stores the job setting in job attribute table 122 along with adequate information to identify the job attribute. For example, job setting manager 120 may store information such as a name and the fact that a conflict exists.

In one embodiment of the invention, after all necessary interpreter modules have processed the print job, the ripped image is passed to print engine controller 118 to emulate printing of the job. In one embodiment of the invention, if no job attributes are in conflict, then the print job is printed or stored in memory or non-volatile storage. In one embodiment of the invention, if no job attributes are in conflict, then printing device 110 prints (or stores in memory or on non-volatile storage for viewing by a user through a file service present on printing device 110) a page that describes the job attributes that will be applied to the job when the job is printed. In one embodiment of the invention, if job attributes are in conflict, then job setting manager 120 alerts the user via a message in a printer control panel or other alert. In one embodiment of the invention, if job attributes are in conflict, then job setting manager 120 causes printing device 110 to print (or store in memory or on non-volatile storage for viewing by a user through a file service present on printing device 110) a document that describes the conflict so that the user may correct the identified conflicts and resubmit the print job.

III. Job Attribute Table

FIG. 2 is a block diagram that illustrates a job attribute table 200 according to one embodiment of the invention. According to an embodiment of the invention, job setting manager 120 stores and maintains a separate job attribute table 200 for each print job that is received at printing device 110. According to an embodiment of the invention, job setting manager 120 populates job attribute table 200 with default information that is related to job attributes, such as paper size and number of copies. These default attributes and values may be user-defined. According to another embodiment of the invention, job setting manager 120 does not populate job attribute table 200 until job setting manager 120 receives, from one or more of interpreter modules 112-116, data that is related to job attributes.

According to an embodiment of the invention, as a print job passes through interpreter modules 112-116, job setting manager 120 receives, from modules 112-116, data regarding any job attributes that are defined by the interpreted data. Job setting manager 120 saves this job attribute data into the job attribute table 200; for example, job setting manager 120 may save (a) the name of the attribute, (b) the value of the attribute, (c) the interpreter module in which the attribute was specified, (d) comments, (e) the existence of a conflict, and (f) any other data that may be user-specified or set at manufacture or factory configuration. If a job attribute has an associated value that conflicts with a value that was set by another module, then job setting manager 120 indicates the conflict in job attribute table 200. For example, job setting manager 120 may indicate the conflict by placing an entry in a "conflict" column of job attribute table 200.

Referring to the example in FIG. 2, a job attribute table 200 has been populated with data. Job attribute table 200 has five columns, although other embodiments are envisioned that have more or fewer columns of data, depending on which information is sought for tracking.

The presentation of the job attribute table 200 as a table of text should not be construed as a limitation of the invention. In one embodiment of the invention, each printing device is capable of storing job attribute table 200 in a format that is readable by the job setting manager of that printing device. While a "table" is described and illustrated herein, it is understood that the actual data comprising job attribute table 200 information might not be stored in tabular form or in a form resembling the illustrated job attribute table 200. In one embodiment of the invention, job attribute table 200 is a JAVA object, and the data comprising job attribute table 200 is stored according to JAVA programming language conventions. In examples where job attribute table 200 is implemented using hardware or other programming languages or paradigms, the data will be created and maintained according to the conventions of that language or hardware.

In the example shown in FIG. 2, the first column is the job attribute name. The second column indicates which interpreter module caused the job attribute to be created or updated in job attribute table 200. The next column is the job attribute value. The column following that one is for any comments that may be stored regarding the job attribute. The final column is to indicate whether a conflict exists between the job attribute values defined by different interpreter modules. This final column also may indicate an invalid job attribute; for example, if an interpreter module detects that a document is to be stapled, but the document exceeds the number or pages that may be stapled by the chosen printing device, then this column may indicate a conflict.

In example job attribute table 200, the first job attribute stored in the job attribute table 200 is "number of copies." Data in the "created/updated" column indicates that the "PJL header interpreter" module last caused this job attribute to be defined or updated. The next column stores the value ("2") for this job attribute.

The next job attribute name is "duplex." Data in the "created/updated" column indicates that the "PCL-XL job body interpreter" was the last module to cause this job attribute to be created or modified. The value for this attribute is "duplex long edge." The "comments" column indicates that this attribute was previously set to "no duplex" by the PJL header interpreter. The "conflict" column indicates that a conflict exists: in this example, the PJL header interpreter caused the value for this attribute to be set to "no duplex," while the PCL-XL body interpreter caused the value to be set to "duplex long edge."

IV. Operational Example

Figure 3:
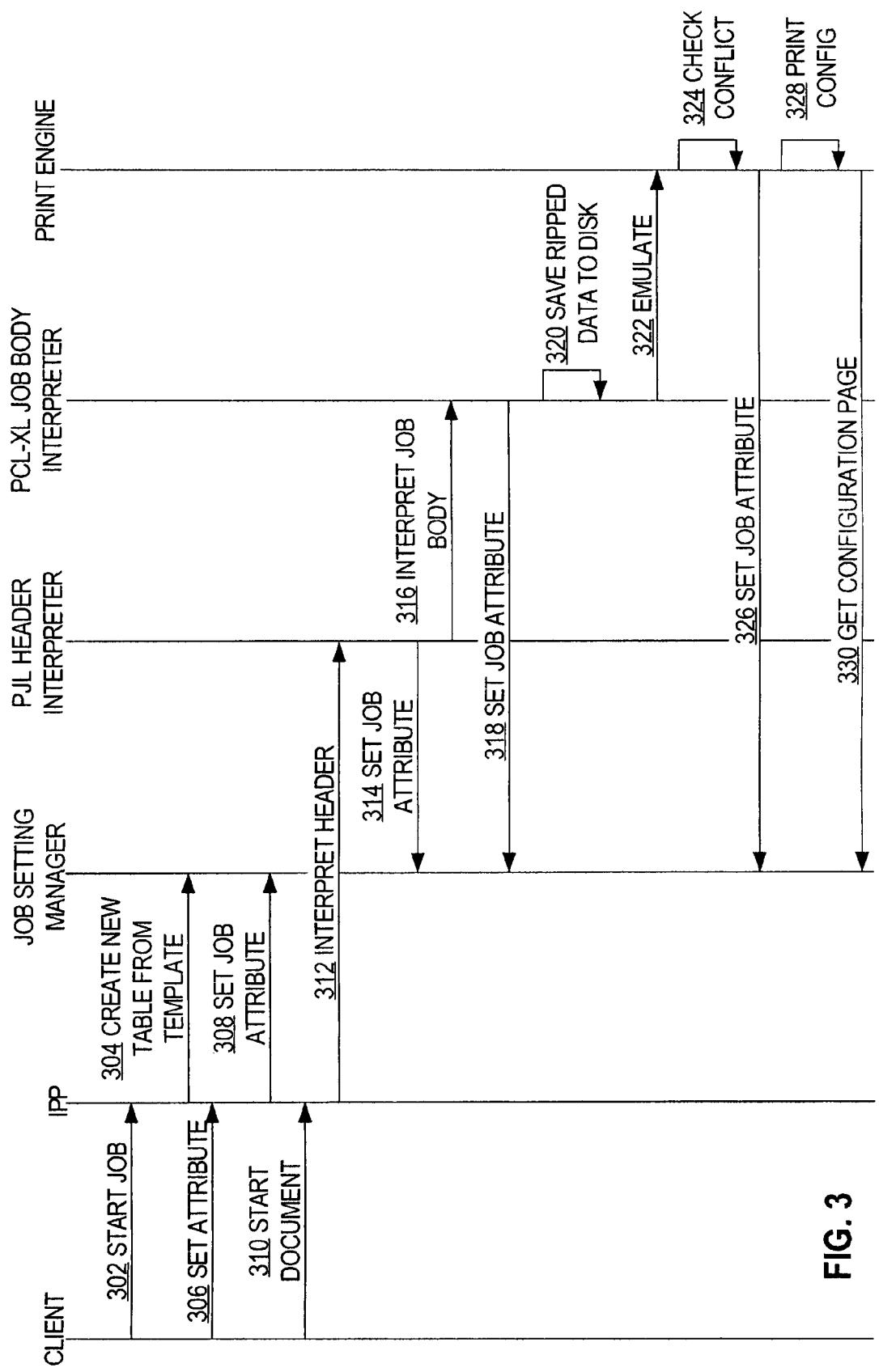
FIG. 3 is a sequence diagram that depicts an approach for "proof printing" print job attributes, according to an embodiment of the invention.

FIG. 3 is a sequence diagram that depicts an approach for "proof printing" print job attributes, according to an embodiment of the invention. In step 302, the client sends a "start print job" command to an IPP module. In step 304, in response to the "start print job" command, the IPP module instructs a job setting manager to create a new table (e.g., job attribute table 200) from a template. In step 306, the client sends a "set attribute" command to the IPP module. In step 308, in response to the "set attribute" command, the IPP module sends a corresponding "set job attribute" command to the job setting manager, and the job setting manager sets a corresponding attribute in the table in response. In step 310, the client sends a "start document" command to the IPP module. In step 312, in response to the "start document" command, the IPP module instructs a PJL header interpreter module to interpret a PJL header in the print data. In step 314, based on the information in the PJL header, the PJL header interpreter module sends a "set job attribute" command to the job setting manager, and the job setting manager sets a corresponding attribute in the table in response. In step 316, the PJL header interpreter instructs a PCL-XL job body interpreter module to interpret a PCL-XL body in the print data. In step 318, based on the information in the PJL-XL body, the PJL-XL job body interpreter module sends a "set job attribute" command to the job setting manager, and the job setting manager sets a corresponding attribute in the table in response. In step 320, the PCL-XL job body interpreter saves ripped data to disk. In step 322, the PCL-XL job body interpreter instructs a print engine to emulate the printing of the print data (without actually printing anything). In step 324, the print engine emulates the printing of the print data and determines if any conflicts exist in the attribute settings. In step 326, depending on whether any conflicts were detected, the print engine sends a "set job attribute" command to the job setting manager, and the job setting manager sets a corresponding attribute in the table in response. In step 328, the print engine prints a configuration page that describes the attributes with which the job will be printed, thereby revealing, to a user, prior to the actual printing of the job, which print attributes are actually going to be applied to the document when the document is actually printed. This involves the print engine getting a configuration page from the job setting manager in step 330.

According to one embodiment of the invention, if conflicts exist, then, according to one embodiment of the invention, a report may be printed detailing information such as (a) the existence of the conflict, (b) which modules are in conflict, (c) what the values for the attributes in conflict are, and (d) any other information that may be stored in the job attribute table. According to an embodiment of the invention, other forms of user notification are envisioned, such as e-mail and pop-up notifications on workstation 102. In one embodiment of the invention, the notification takes the form of a list of print job settings. The list may indicate which job settings conflict. Printing device 110 may print the list on a banner page, for example.

In one embodiment of the invention, a user submits (through workstation 102) a document to printing device 110 with a special "proof job ticket" command. In response to receiving such a command, printing device 110 prints a detailed job setting report instead of the actual print job. The job setting report lists all of the print job settings that will be applied to the print job. The job setting report also may indicate conflicts, if any, between print job settings. For example, in the job setting report, job settings that are in conflict with each other may be listed and highlighted to distinguish those job settings from other job settings that do not conflict. In such an embodiment of the invention, printing device 110 may store a digital copy of the actual print job; the user may instruct printing device 110 to print the stored copy of the print job at a later time.

V. Implementation Mechanisms

Figure 4:
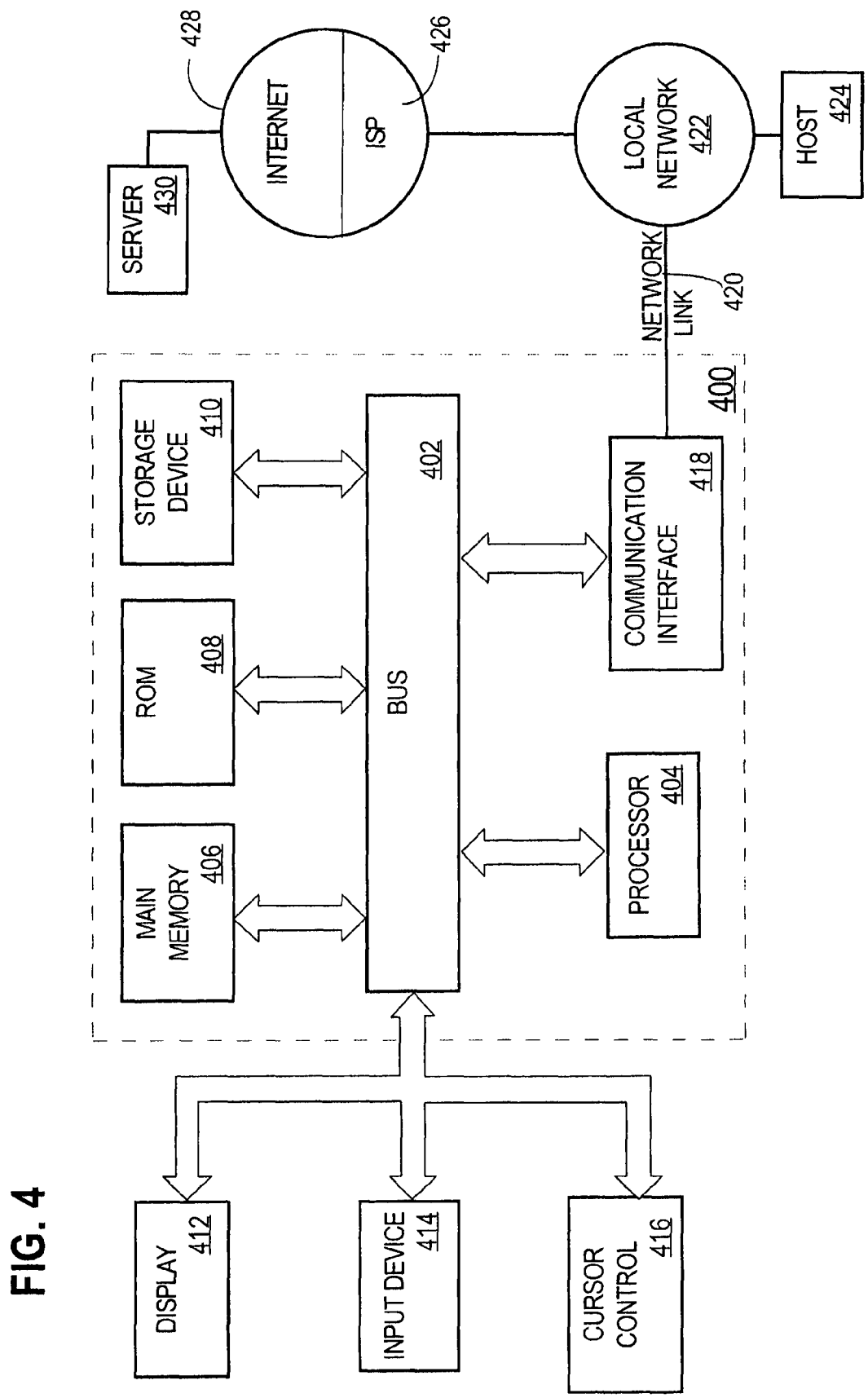
FIG. 4 is a is a block diagram of a computer system on which embodiments of the invention may be implemented

Although primarily described herein in the context of printing devices, the approach is applicable to any type of network device or element. The approach described herein and the various elements may be implemented in hardware, computer software or any combination of hardware and computer software on any type of computing platform. FIG. 4 is a block diagram that illustrates an example computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operation in a specific fashion. In an embodiment implemented using computer system 400, various computer-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   a memory storing instructions which, when processed by the one more processors, cause:
   receiving a print data stream that includes a plurality of print attributes;
   performing a simulation for printing of a print job, wherein the print job is represented by the print data stream;
   determining, from the simulation, two or more print attribute values from the plurality of print attribute values included in the print data stream that conflict by identifying, in the print data stream, at least a first print attribute value for a print attribute that is specified in a header portion of the print data stream, and a second print attribute value for the print attribute that both conflicts with the first print attribute value and is specified in a body portion of the print data stream, wherein the header portion of the print data stream is separate from the body portion of the print data stream; and
   in response to determining the two or more print attribute values that conflict, generating a notification that identifies the two or more print attribute values that conflict.

2. An apparatus of claim 1, wherein generating the notification comprises printing data that identifies the two or more print attribute values that conflict.

3. An apparatus of claim 1, further comprising additional instructions which, when processed by the one or more processors, cause printing data that identifies the plurality of print attribute values that are included in the print data stream.

4. An apparatus of claim 1, wherein the first print attribute value is specified in a first printer description language, and the second print attribute value is specified in a second printer description language that differs from the first printer description language.

5. An apparatus of claim 1, wherein either the first print attribute value for the print attribute or the second print attribute value for the print attribute is a default value.

6. An apparatus of claim 1, wherein the first print attribute value is specified in PJL, and the second print attribute value is specified in either PCL or PCL-XL.

7. An apparatus of claim 1, further comprising additional instructions which, when processed by the one or more processors, cause generating the notification in response to receiving an instruction to execute the simulation without printing the print job.

8. An apparatus of claim 1, further comprising additional instructions which, when processed by the one or more processors, cause generating the notification to a user by one or more of displaying the notification on a screen, or emailing the notification to a specified email address.

9. An apparatus of claim 1, further comprising additional instructions which, when processed by the one or processors, cause identifying one or more print attribute values in the print stream or simulation, and storing the one or more print attribute values in a data structure.

10. One or more non-transitory computer-readable media storing instructions which, when processed by one or more processors, cause performance of:
receiving a print data stream that includes a plurality of print attributes;
performing a simulation for printing of a print job, wherein the print job is represented by the print data stream;
determining, from the simulation, two or more print attributes from the plurality of print attributes included in the print data stream that conflict by identifying, in the print data stream, at least a first print attribute value for a print attribute that is specified in a header portion of the print data stream, and a second print attribute value for the print attribute that both conflicts with the first print attribute value and is specified in a body portion of the print data stream, wherein the header portion of the print data stream is separate from the body portion of the print data stream; and
in response to determining that two or more print attributes that conflict, generating a notification that identifies the two or more print attributes that conflict.

11. The one or more non-transitory computer-readable media as recited in claim 10, wherein generating the notification comprises printing data that identifies the two or more print attribute values that conflict.

12. The one or more non-transitory computer-readable media as recited in claim 10, further comprising additional instructions which, when processed by the one or more processors, causes performance of printing data that identifies the plurality of print attribute values that are included in the print data stream.

13. The one or more non-transitory computer-readable media as recited in claim 10, wherein the first print attribute value is specified in a first printer description language, and the second print attribute value is specified in a second printer description language that differs from the first printer description language.

14. The one or more non-transitory computer-readable media as recited in claim 10, wherein either the first print attribute value for the print attribute or the second print attribute value for the print attribute is a default value.

15. The one or more non-transitory computer-readable media as recited in claim 10, wherein the first print attribute value is specified in PJL, and the second print attribute value is specified in either PCL or PCL-XL.

16. The one or more non-transitory computer-readable media as recited in claim 10, wherein generating the notification in response to receiving an instruction to execute the simulation without printing the print job.

17. The one or more non-transitory computer-readable media as recited in claim 10, further comprising additional instructions which, when processed by the one or more processors, causes performance of generating the notification to a user by displaying one or more of the notification on a screen, or emailing the notification to a specified email address.

18. The one or more non-transitory computer-readable media as recited in claim 10, further comprising additional instructions which, when processed by the one or more processors, causes performance of identifying one or more print attribute values in the print stream or simulation, and storing the one or more print attribute values in a data structure.

19. A method comprising:
receiving a print data stream that includes a plurality of print attributes;
performing a simulation for printing of a print job, wherein the print job is represented by the print data stream;
determining, from the simulation, two or more print attributes from the plurality of print attributes included in the print data stream that conflict by identifying, in the print data stream, at least a first print attribute value for a print attribute that is specified in a header portion of the print data stream, and a second print attribute value for the print attribute that both conflicts with the first print attribute value and is specified in a body portion of the print data stream, wherein the header portion of the print data stream is separate from the body portion of the print data stream; and
in response to determining that two or more print attributes that conflict, generating a notification that identifies the two or more print attributes that conflict.

20. The method as recited in claim 19, wherein generating the notification is performed in response to receiving an instruction to execute the simulation without printing the print job.

* * * * *